United States Patent
Hong et al.

(10) Patent No.: US 8,654,084 B2
(45) Date of Patent: Feb. 18, 2014

(54) PORTABLE TERMINAL

(75) Inventors: Sung-Chul Hong, Seoul (KR);
Byung-Duck Park, Seoul (KR);
Kyoung-Taek Lim, Seoul (KR);
Sang-Chul Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 1155 days.

(21) Appl. No.: 12/106,835

(22) Filed: Apr. 21, 2008

(65) Prior Publication Data

US 2009/0015565 A1 Jan. 15, 2009

(30) Foreign Application Priority Data

Jul. 12, 2007 (KR) .................. 10-2007-0070283

(51) Int. Cl.
*G06F 3/041* (2006.01)

(52) U.S. Cl.
USPC ........... 345/173; 345/174; 345/175; 345/169; 178/18.01; 178/18.03; 178/18.07; 455/575.1; 455/575.4; 361/679.1; 361/679.27

(58) Field of Classification Search
USPC ......... 345/87–88, 92, 98–100, 102, 173–175, 345/169; 379/53, 58, 110; 361/679, 1, 361/679.27, 679.29; 455/575.1, 575.4; 178/18.01–18.07
See application file for complete search history.

(56) References Cited

U.S. PATENT DOCUMENTS

| | | | | |
|---|---|---|---|---|
| 5,451,724 A * | 9/1995 | Nakazawa et al. | ......... | 178/18.05 |
| 5,710,415 A * | 1/1998 | Kono et al. | ..................... | 235/7 R |
| 5,920,310 A * | 7/1999 | Faggin et al. | ................. | 345/173 |
| 6,388,660 B1 * | 5/2002 | Manser et al. | ................ | 345/173 |
| 7,013,558 B2 * | 3/2006 | Bachman | ........................ | 29/832 |
| 7,486,278 B2 * | 2/2009 | Sun | ................ | 345/173 |
| 2006/0012578 A1 * | 1/2006 | Ohtake | ......................... | 345/173 |
| 2007/0128904 A1 * | 6/2007 | Kang et al. | .................... | 439/159 |
| 2008/0024388 A1 * | 1/2008 | Bruce | ........................... | 345/1.1 |

* cited by examiner

*Primary Examiner* — Lun-Yi Lao
*Assistant Examiner* — Shaheda Abdin
(74) *Attorney, Agent, or Firm* — Birch, Stewart, Kolasch & Birch, LLP

(57) ABSTRACT

Disclosed is a portable terminal including a window for inputting information by a touching manner, a terminal body having a display module which is mounted therein and a window mounting portion for mounting the window at a front surface of the display module, and a coupling unit having one end inserted into the window and another end coupled to the window mounting portion so as to couple the window to the terminal body. The window and the terminal body are structurally coupled to each other, thereby providing stronger coupling force between the window and the terminal body.

14 Claims, 7 Drawing Sheets

PORTABLE TERMINAL

CROSS REFERENCE TO RELATED APPLICATIONS

The present invention is related to, and claims priority from, Korean patent application KR 10-2007-0070283, filed on Jul. 12, 2007, the entire contents of which being incorporated herein by reference.

BACKGROUND OF THE INVENTION

1. Field of the Invention

The present invention relates to a portable terminal having a coupling unit for coupling a window performing a touch screen function to a terminal body.

2. Description of the Related Art

Portable terminals can be easily carried and have one or more of functions such as supporting voice calls and telephony calls, inputting and/or outputting information, storing data and the like.

Multifunctional portable terminals can capture still images or moving images, play music or video files, play games, receive broadcast and the like, so as to be implemented as an integrated multimedia device. To support these functions, a user interface environment is provided in order for users to easily and conveniently retrieve or select functions. The outward appearance of the portable terminal may be customized to express his/her personality. However, cover plates used that are typically applied for this function are subject to breakage.

SUMMARY OF THE INVENTION

Therefore, the present invention is directed to strengthening a coupling force through a structural coupling, comparing with the coupling by using an adhesive agent, when a window having a touch screen function is coupled to a terminal body.

Further, the present invention is directed to minimizing a detached state of a window at high temperature which is generated by coupling the window to the terminal body by using an adhesive agent.

Further, the present invention is directed to providing a portable terminal having a coupling unit which is capable of coupling a window to a terminal body and dissipating a static electricity generated at an interior or exterior of the terminal.

To achieve these and other advantages and in accordance with the purpose of the present invention, as embodied and broadly described herein, there is provided a portable terminal comprising: a window for inputting information by a touching manner; a terminal body having a display module which is mounted therein and a window mounting portion for mounting the window at a front surface of the display module; and a coupling unit having one end which is inserted into the window and another end which is coupled to the window mounting portion so as to couple the window to the terminal body.

The window may comprise: a base mounted at the window mounting portion; an electrode layer formed at the front surface of the base so as to sense the touching; and a protecting layer formed at the front surface of the electrode layer so as to protect the electrode layer.

The one end of the coupling unit may be inserted into the base to be fixed thereto.

An insertion hole may be formed at the window mounting portion, and the coupling unit may comprise a female screw provided with a screw hole. A male screw may be coupled to the female screw by passing through the insertion hole so that the window and the terminal body may be coupled to each other.

The coupling unit may further comprise a flange locked at the terminal body so as to prevent the window from being outwardly separated.

A protruded stopper may be formed at the window mounting portion, and the coupling unit may further comprise a hook having one end locked at the protruded stopper.

An insertion protrusion may be formed at the window mounting portion, and the coupling unit may further comprise a holder having one end provided with an insertion recess into which the insertion protrusion is inserted.

The coupling unit may be connected to the electrode layer, and be electrically connected to a ground formed at the terminal body so as to dissipate a static electricity generated at an interior or exterior of the terminal body.

The window mounting portion may be coated with an EMI (Electromagnetic Interference) barrier material, and the coupling unit may be contacted with the EMI barrier material so as to dissipate the static electricity.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate preferred embodiments of the invention and together with the description serve to explain the principles of the invention. In the drawings.

DETAILED DESCRIPTION OF THE INVENTION

Description will now be given in detail of the preferred embodiments of the present invention, examples of which are illustrated in the accompanying drawings.

Figure 1:
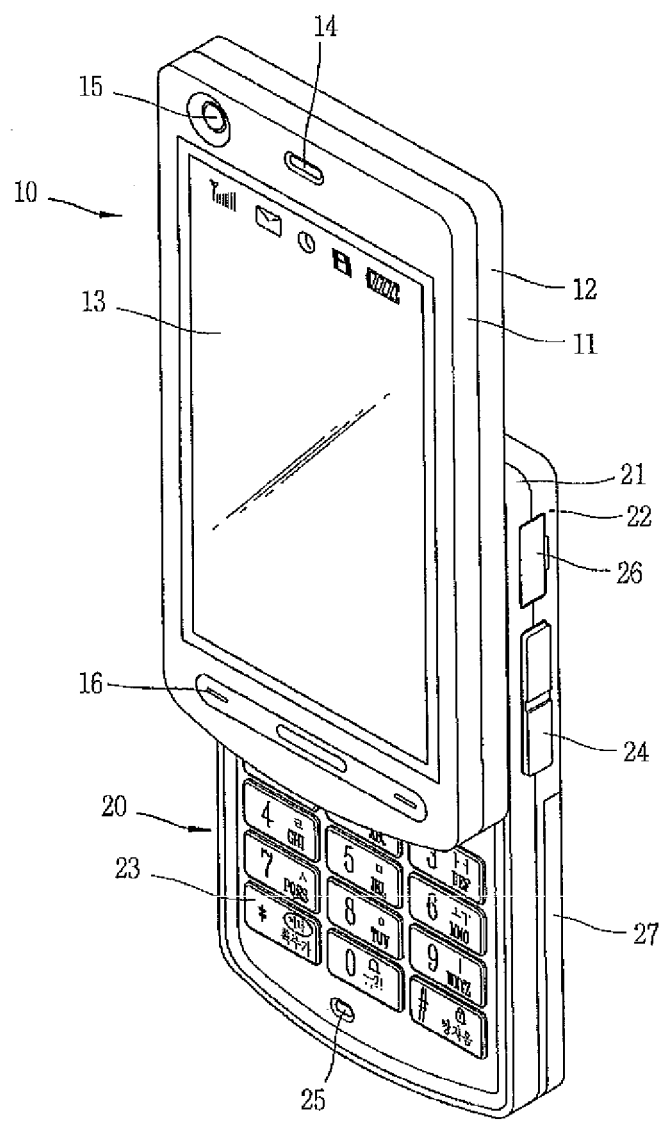
FIG. 1 is a front perspective view showing a portable terminal in accordance with one embodiment of the present invention.

FIG. 1 is a front perspective view showing a portable terminal in accordance with one embodiment of the present invention. The portable terminal may be a cell phone configured to communicate with another device via a base station.

The portable terminal in accordance with the present invention includes a first body 10, and a second body 20 slidable in at least one direction with respect to the first body 10.

Hereinafter, a slide-type portable terminal will be described, but it is possible to apply to various types of portable terminal such as a bar-type, a folder-type, a swivel-type or the like.

A configuration that the first body 10 and the second body 20 are overlapped to each other may be referred to as a closed configuration. And, as shown in the drawing, the configuration that at least one portion of the second body 20 is exposed by the first body 10 may be referred to as an open configuration.

In the closed configuration, the portable terminal may be mainly operated in a standby mode, but the standby mode may be released by a user's manipulation. In the open configuration, the portable terminal may be mainly operated in a call mode, but the call mode may be converted into the standby mode by the user's manipulation or after a certain time duration.

A case (a casing, a housing, a cover, etc.) forming an exterior of the first body 10 may be formed by a front case 11 and a rear case 12. Electronic components may be disposed in a space formed by the front case 11 and the rear case 12.

At least one middle case may be additionally disposed between the front case 11 and the rear case 12.

The cases may be formed of a synthetic resin in a manner of injection, or formed of a metallic material such as stainless steel (STS) or titanium (Ti).

A display portion 13, a sound output unit 14, a first video input unit 15 or a first manipulating portion 16 may be disposed at the first body 10, particularly, at the front case 111.

The display portion 13 includes a Liquid Crystal Display (LCD) module, an Organic Light Emitting Diodes (OLED) module and the like to visually represent information.

And, the display portion 13 may further include a touch screen such that a user can input information in a touching manner.

The sound output unit 14 may be implemented as a receiver or a speaker.

The first video input unit 15 may be implemented as a camera module for photographing still images or moving images with respect to the user.

The first manipulating portion 16 receives commands for controlling the operation of the portable terminal in accordance with one embodiment of the present invention.

Likewise the first body 110, the case of the second body 20 can be formed by a front case 21 and a rear case 22.

A second manipulating portion 23 may be disposed at the second body 20, particularly, at a front face of the front case 21.

A third manipulating portion 24, a sound input unit 25 and an interface 26 may be disposed at least one of the front case 21 or the rear case 22.

The first to third manipulating portions 16, 23, 24 may be referred to as a manipulating portion, which can adapt any manner like a tactile manner that a user can touch for manipulation.

For example, the manipulating portion may be implemented as a dome switch, the touch switch, a touchpad by which a user can input commands or information in a pushing or touching manner. Alternatively, the manipulating portion may be implemented, for example, as a wheel, a jog or a joystick.

Functionally, the first manipulating portion 16 is configured to input commands such as start, end, scroll or the like, and the second manipulating portion 23 is configured to input figures, letters, symbols or the like. Also, the third manipulating portion 24 can be worked as a hot key which performs a specific function, such as activating the first image input unit 15.

The first sound input unit 25 may be implemented, for example, as a microphone to receive user's voice or other sound.

The interface 26 may serve as a path which allows the portable terminal to exchange data with external devices. For example, the interface 26 may be used in a wired or wireless manner, and may be at least one of a connection terminal to which an earphone is connected, a port for a local communication (e.g., infrared data (IrDA) port, Bluetooth port, wireless Lan port, etch), or a power supply terminal for supplying power to the portable terminal.

The interface 26 may be a card socket for receiving an external card such as a Subscriber Identification Module (SIM), a User Identity Module (UIM) or a memory card for storing information.

A power supply portion 27 is provided at the rear case 22 to supply power to the portable terminal. The power supply portion 27 may be a rechargeable battery to be detachably coupled to the portable terminal for charging, for example.

Figure 2:
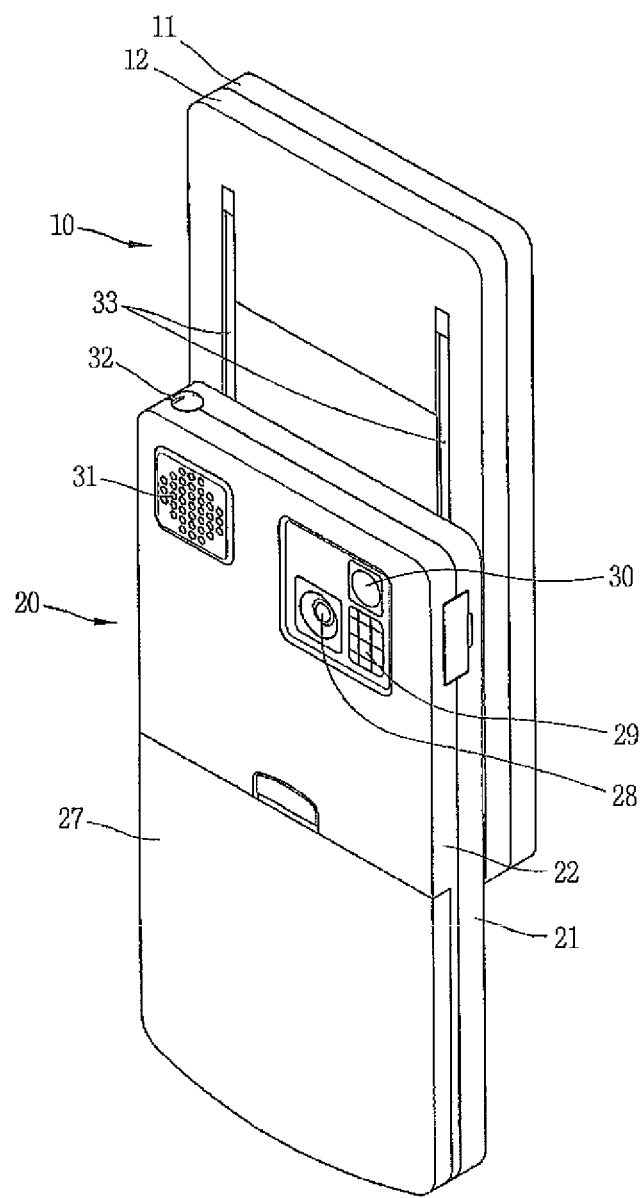
FIG. 2 is a rear perspective view showing the portable terminal in accordance with one embodiment of the present invention.

FIG. 2 is a rear perspective view showing the portable terminal of FIG. 1.

Referring to FIG. 2, a second image input unit 28 may be additionally mounted at the rear surface of the rear case 22 of the second body 20. A photographing direction of the second video input unit 28 may be substantially opposite to that of the first image input unit 15 (refer to FIG. 1). And, the second image input unit 28 may be implemented as the camera having pixels different from that of the first image input unit 15.

For example, preferably, the first image input unit 15 has low pixels so that the user can photograph himself/herself to transmit to an other party, and the second image input unit 28 has high pixels because it is frequent that the user photographs a subject and does not transmit immediately, in case of a video telephony call or the like.

A flash 29 and a mirror portion 30 are additionally disposed adjacent to the second image input unit 28. When photographing the subject by using the second image input unit 28, the flash 29 throws a flashlight on the subject. When the user photographs himself/herself by using the second image input unit 28, the mirror portion 30 can be used for the user to look at himself/herself therein.

A second sound output unit 31 may be additionally disposed at the rear case 22.

The second sound output unit 31 may implement a stereo function together with the first sound output unit 14 (refer to FIG. 1), and be used for a telephony call in a speaker phone mode.

Further, one side of the rear case 22 may be provided with a broadcast signal receiving antenna 32 as well as an antenna for the telephony call. The antenna 32 may be extendably installed at the second body 20.

The rear case 12 of the first body 10 may be provided with one portion of a slide module 33 for slidably coupling the first and second bodies 10, 20 to each other.

Another portion of the slide module 33 may be disposed at the front case 21 of the second body 20, but may not be exposed as shown in the drawing.

The second video input unit 28 is disposed at the second body 20 as abovementioned, but is not limited thereto. For example, at least one of the components 28 to 32 that are disposed at the rear case 22 of the second body 20 such as the second image input unit 28 can be mounted at the first body 10, mainly, at the rear case 12. In this case, it is advantageous that the component(s) disposed at the rear case 12 is protected by the second body 20 in the closed configuration. Further, even if the second image input unit 28 is not additionally disposed, the first image input unit 15 may be rotatably formed so that it is possible to photograph including the photographing area of the second image input unit 28.

Figure 3:
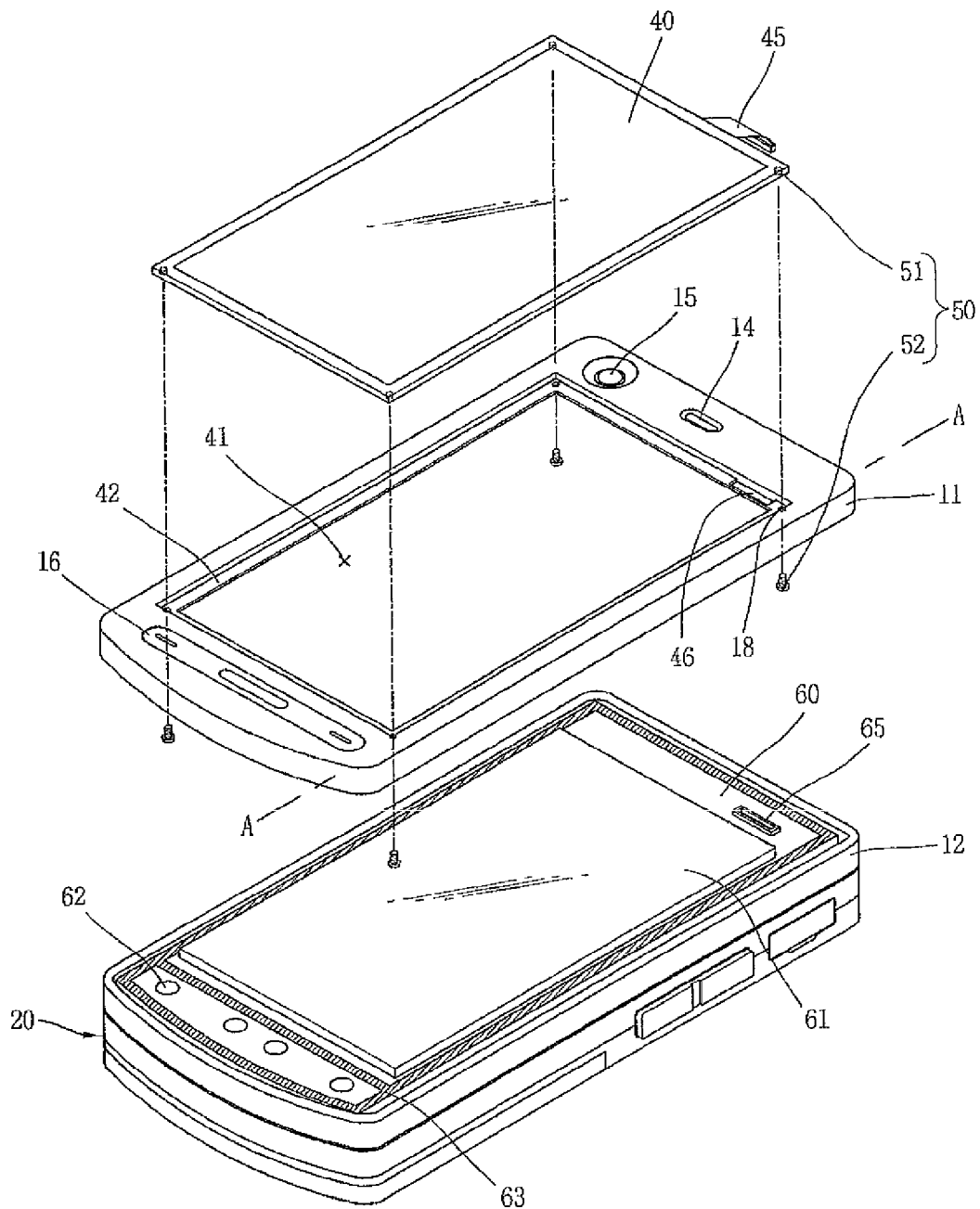
FIG. 3 is an exploded perspective view showing the portable terminal in accordance with one embodiment of the present invention.
Figure 4:
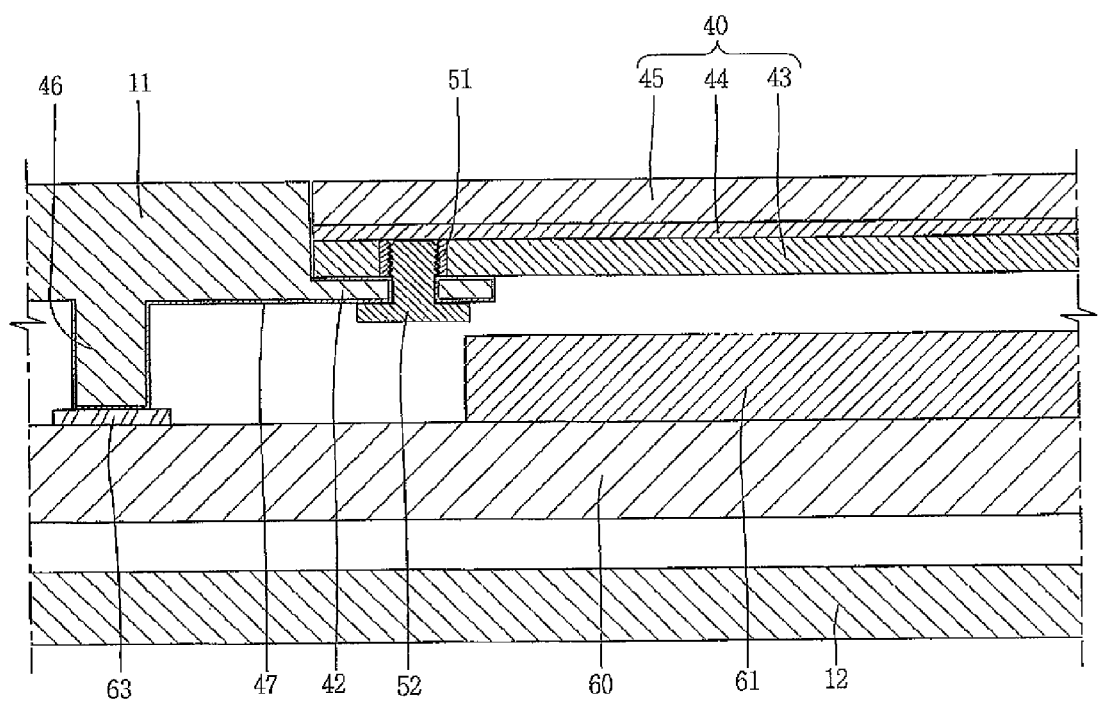
FIG. 4 is a cross-sectional view taken along line A-A in the portable terminal of FIG. 3.

FIG. 3 is an exploded perspective view showing the portable terminal in accordance with the first embodiment of the present invention, showing an internal structure of the first body. And, FIG. 4 is a cross-sectional view taken along line A-A of the portable terminal of FIG. 3.

The portable terminal in accordance with the present invention includes the terminal body (hereinafter, referred to as the first body) 10, a window 40 and a coupling unit 50.

The first body 10 is formed by the front case 11 and the rear case 12 coupled to each other. The display portion 13 (refer to FIG. 1) is disposed at the front surface of the front case 11.

A printed circuit board 60 on which various electronic components for operating the portable terminal are mounted is disposed in the first body 10, that is between the front case 11 and the rear case 12.

A display 61 (for example, LCD, OLED, etc.) for displaying information on the screen by electric signals is mounted at the front surface of the printed circuit board 60. And, a switch 62 for inputting signals according to pushing operation of the first manipulating portion 16 is mounted at a lower side of the display 61.

A display installation hole 41 is formed at the front case 11 so that the display can be seen. And, a window mounting portion 42 is formed at the display installation hole 41 so that the window 40 may be mounted at the front case 11. The window mounting portion 42 is formed as a protrusion in a central direction of the front case 11 along an outer circumferential surface of the window installation hole 41 so as to support the window 40 when the window 40 is mounted thereat.

The window 40 for protecting the display 61 is disposed at the front surface of the display 61 and provided with a light translucent area to allow the screen displayed on the display 61 to be seen. Also, the window 40 is configured to input information by the user's touching. Here, so as to implement the touch screen function to the window, a contacting electrostatic capacity manner, a pressurizing resistance manner or the like may be used.

Conventionally, a step height is formed through a stepping process at the lateral surface of the window which is formed of a synthetic resin and which does not include the touch screen function. The window is coupled towards the front surface from the rear surface of the front case so as to prevent the window from being outwardly separated, by the step height.

However, because the window 40 having the touch screen function is configured to be a plurality of layers and should be processed with a flexible printed circuit board for being electrically connected to the interior of the first body 10, the conventional stepping process may not be easy to perform. Accordingly, the window 40 in accordance with the present invention is coupled to the front case 11 in a direction towards the rear surface from the front surface of the front case 11, and mounted at the window mounting portion 42. Here, the window 40 may be mounted at the window mounting portion 42 by an adhesive agent or an adhesive film.

As shown in FIG. 4, the window 40 includes a base 43, an electrode layer 44 and a protecting layer 45.

The base 43 is mounted at the window mounting portion 42 to allow to be disposed at the front surface of the display 61.

The base 43 may be formed of a synthetic resin such as PC (Poly Carbonate), PMMA (Poly Methyl Meta Acrylate), etc.

The electrode layer 44 is formed at the front surface of the base 43 so as to sense the touching. And, the electrode layer 44 may be formed of an ITO (Indium-Tin-Oxide) film. The flexible printed circuit board (FPCB) 45 may be connected to the electrode layer 44 to allow the printed circuit board 60 mounted in the first body 10 to be electrically connected to the electrode layer 44. Here, a through hole 46 is formed at the window mounting portion 42 to allow the flexible printed circuit board 45 to be connected to a connector 65 disposed on the printed circuit board 60 therethrough.

The protecting layer 45 exists to protect the electrode layer 44 physically and chemically, and is formed at the front surface of the electrode layer 44. The protecting layer 45 may be formed of a synthetic resin such as PET (Polyethylene Terephthalate).

The base 43, the electrode layer 44 and the protecting layer 45 are provided with the light translucent area so that contents displayed on the screen of the display 61 can be seen. The base 43, the electrode layer 44 and the protecting layer 45 may be formed of a transparent material over the entire surfaces. The protecting layer 45 may further include a printed layer so as to have a greater design or for the user not to identify the edge areas of the display 61 and the coupling unit 50.

The coupling unit 50 operates to couple the front case 11 of the first body 10 to the window 40, and to electrically connect the window to a ground formed at the first body 10.

The window mounting portion 42 of the front case 11 and the window 40 may be adhered by the adhesive agent or the adhesive film, but the coupling unit 50 related to the present invention allows the front case 11 and the window 40 to be structurally coupled to each other.

The coupling unit 50 is formed of a conductive material and inserted into the base 43 so that the coupling unit 50 is contacted with the electrode layer 44 to be electrically connected thereto. The coupling unit 50 includes a female screw 51 having a screw hole therein. The female screw 51 is inserted into the base 43 to be connected to the electrode layer 44 of the window 43. The plurality of female screws 51 may be formed of a metallic material and disposed at the edges of the window 40 with a certain interval therebetween. In accordance with the present invention, four female screws 51 are disposed at each edge of the window 40.

The window mounting portion 42 of the front case 11 is provided with insertion holes 18 to allow male screws 52 to be inserted thereinto. The male screw is coupled to the female screw 51 by passing through the insertion hole 18 in the direction towards the front surface from the rear surface of the window 40 so that the window 40 and the front case 11 are coupled to each other.

To electrically connecting the electrode layer of the window 40 to the ground of the first body 10, an EMI (Electromagnetic Interference) barrier material 47 may be coated on the window mounting portion 42. Conductive powder such as nickel, copper, silver or graphite, or conductive paint fabricated by mixing a flake with a resin such as vinyl, acryl, polyurethane, epoxy may be used for the EMI barrier material 47.

A metallic pattern 63 may be formed on the printed circuit board 60 to serving as the ground. And, a rib 46 contacting with the metallic pattern 63 may be formed at the rear surface of the front case 11. The EMI barrier material 47 may be coated from the window mounting portion 42 to the rear surface of the front case 11 and the rib 46 so as to dissipate a static electricity.

The static electricity generated at the exterior or interior of the terminal body 10, 20 may be negatively affected to the electronic components mounted in the terminal body 10, 20, such as malfunction by hardware or software.

The coupling unit 50 in accordance with the present invention operates to physically couple the window 40 to the first body 10 and to minimize the effects caused by the static electricity on the electronic components mounted in the first body 110

When the static electricity is generated at the interior or exterior of the first body 10, the static electricity passes through the conductive female screw 51 connected to the electrode layer 44 of the window 40 to be dissipated to the metallic pattern 63 of the printed circuit board 60 through the EMI barrier material 47.

The manner for dissipating the static electricity to the ground can be implemented in various manners as well as the manner in accordance with the embodiment. For example, the coupling screw coupling the front case 11, the rear case 12 and the printed circuit board 60 of the first body 10 to each other are electrically connected to the printed circuit board 60 so that the static electricity can be dissipated through the coupling screw.

Thus, in a situation when the first body 10 and the window 40 are adhered to each other by only the adhesive agent, if the portable terminal is left at high temperature, an adhesive force therebetween may deteriorate so that the window 40 may be detached therefrom. The coupling unit 50 in accordance with the present invention can minimize the detached state of the window 40. That is, the window 40 and the first body 10 are structurally coupled to each other (by the screw coupling manner) so that it is possible to minimize the negative effects on the portable terminal even if the portable terminal is left at high temperature.

Further, when the adhesive agent is used for coupling of the first body 10 and the window 40 together with the coupling unit 50, the coupling force between the first body 10 and the window 40 can be strengthened. And, a contacting area of the adhesive agent, i.e., a width of the window mounting portion 42, can be narrower by the strengthened coupling force, thereby enabling the size of the screen that the user can see in the display 61 to be relatively enlarged.

Figure 5:
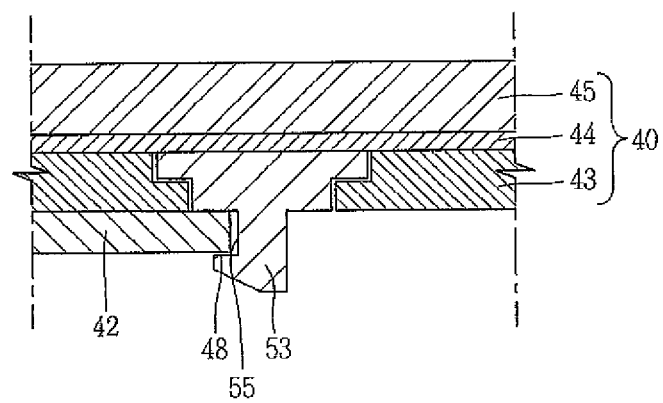
FIG. 5 is a cross-sectional view showing another embodiment of the coupling unit of the portable terminal in accordance with one embodiment of the present invention.
Figure 6:
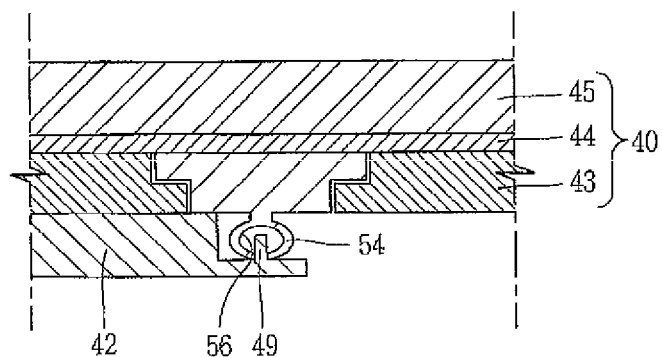
FIG. 6 is a cross-sectional view showing the other embodiment of the coupling unit of the portable terminal in accordance with one embodiment of the present invention.

FIGS. 5 and 6 are cross-sectional views showing other embodiments of the coupling unit 50 in the portable terminal in accordance with the present invention.

The coupling unit 50 described in the FIGS. 5 and 6 has the same basic configuration and operations as that of the first embodiment. But, the configuration for coupling the window 40 and the first body 10 are differently implemented.

As shown in FIG. 5, the coupling unit 50 may be formed in a shape of hook 53. That is, a protruded stopper 48 is formed at the window mounting portion 42 of the front case 11, and a stopping recess 55 corresponding to the protruded stopper 48 is formed at the lateral surface of the hook 53. By such configuration, the hook 53 is locked at the protruded stopper 48 of the window mounting portion 42, accordingly the window 40 and the front case 11 are coupled to each other.

As shown in FIG. 6, the coupling unit 50 includes a holder 54 having an insertion recess 56 into which an insertion protrusion 49 formed at the window mounting portion 42 is inserted. The insertion protrusion 49 protruded towards the holder 54 with having the front surface corresponding to the position of the holder 54 is formed at the window mounting portion 42 of the front case 10. The insertion recess 56 of the holder 54 is formed in a ring shape having one opened surface. When the insertion protrusion 49 is inserted into the opened portion of the holder 54, the holder 54 may fix the insertion protrusion 49. Here, preferably, the insertion recess 56 of the holder 54 and the insertion protrusion 49 is coupled in a forcedly inserting manner.

The hook 53 and the holder 54 described in FIGS. 5 and 6, are also electrically connected to the electrode layer 44 of the window 40, and thereby dissipating the static electricity to the ground. To perform the abovementioned, the surface that the rear surface of the front case 11 of the first body 10 are contacted with the hook 53 of the window mounting portion 42 and the holder 54 may be covered with the EMI barrier material 47.

The coupling units 53, 54 in FIGS. 5 and 6, are advantageous in that the configurations thereof are more simple than that of the coupling by the screw and the effects are same with only one member.

Figure 7:
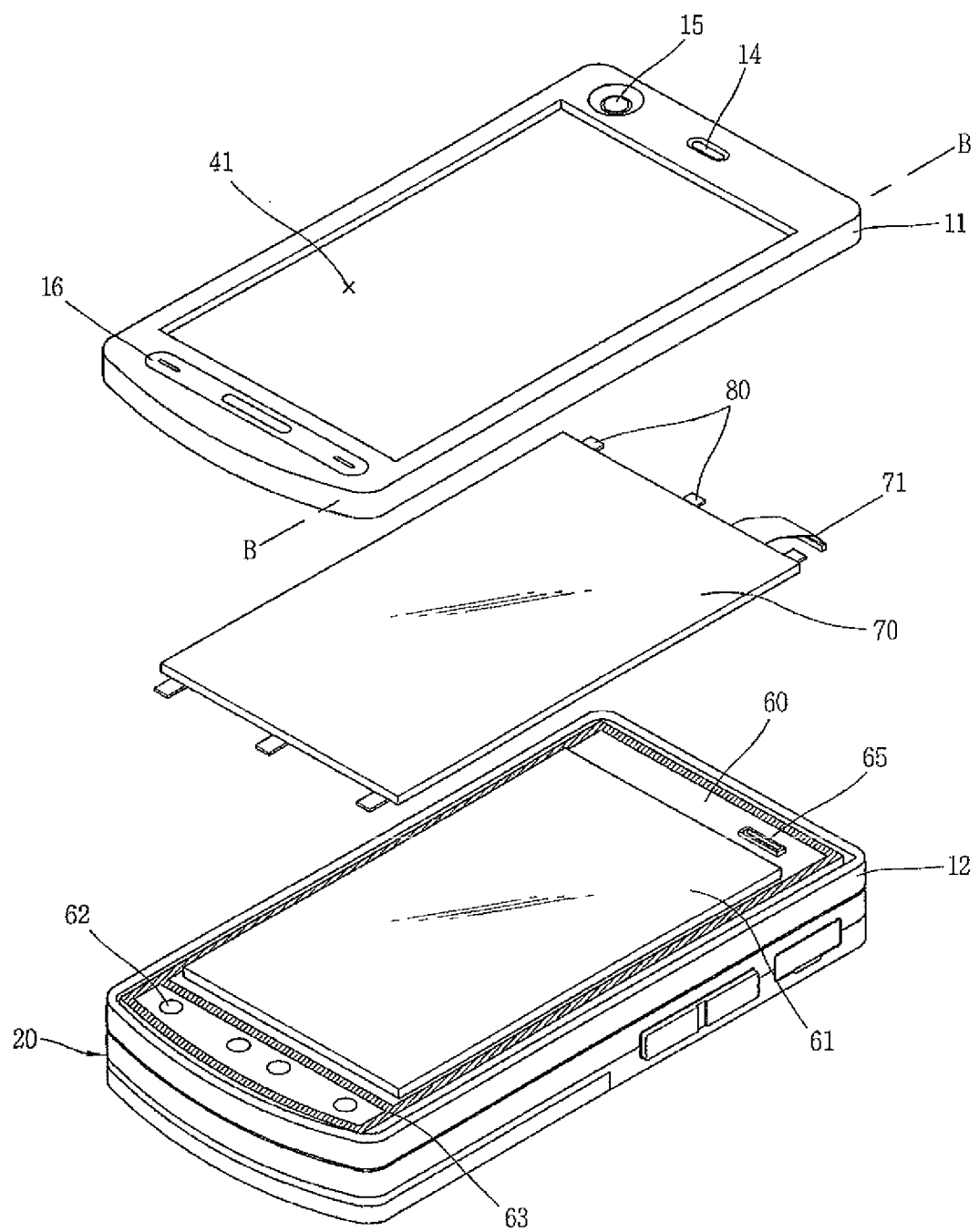
FIG. 7 is an exploded perspective view showing a portable terminal in accordance with another embodiment of the present invention.
Figure 8:
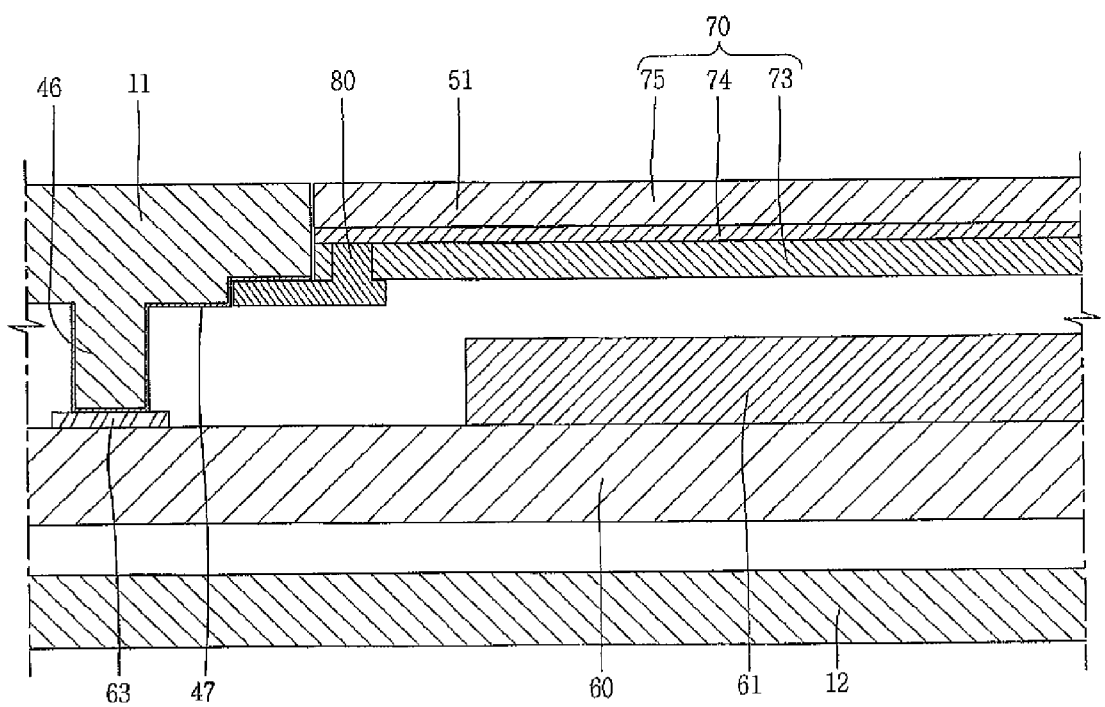
FIG. 8 is a cross-sectional view taken along line B-B in the portable terminal of FIG. 7.

FIG. 7 is an exploded perspective view showing a portable terminal in accordance with another embodiment of the present invention, and FIG. 8 is a cross-sectional view taken along line B-B of the portable terminal in FIG. 7. Hereafter, same configurations with the previously described embodiment will be referenced by same numerals.

In the previously described embodiments, the window 40 is coupled to the front case 11 in the direction towards the rear surface from the front surface of the front case 11. But, in the embodiment of FIGS. 7-8, a window 70 is coupled to the front case 11 in the direction towards the front surface from the rear surface of the front case 11.

The window 70 includes a base 73, an electrode layer 74 and a protecting layer 75 same as the previously described embodiment. A flexible printed circuit board 71 is connected to the connector 65 of the printed circuit board 60 so that the window 70 and the printed circuit board 60 are electrically connected to each other.

The coupling unit in accordance with the embodiment includes a flange 80 preventing the window 70 from being outwardly separated by being locked at the front case 11.

One end of the flange 80 is contacted with the electrode layer 74 disposed at the front surface of the base by being inserted into the base 73 to be electrically connected thereto. And, another end of the flange 80 is formed in a bar shape extended from the lateral surface of the window 70 towards the front case 11. The flange 80 may be formed of a conductive material such as a metallic material.

The flange 80 may be plurally disposed in a circumferential direction of the window 70. In the embodiment, the flanges 80 are disposed at an upper side and a lower side of the window 70. But, the flanges 80 may be disposed at a right side and a left side of the window 70.

With such configuration, when the window 70 is coupled towards the front surface from the rear surface of the front case 11, the plurality of flanges 80 are locked at the upper side and the lower side of the front case so as to prevent the window 70 from being outwardly separated.

The EMI barrier material 47 is coated on the rear surface of the front case 11, and the configuration that the flange 80 is contacted therewith so that the static electricity is dissipated is same as that of the previous embodiment. Thus, the description will be omitted.

In the portable terminal in accordance with the present invention, the window having the touch screen function is coupled to the terminal body by the structurally coupled manner, accordingly being capable of strengthening the coupling force.

Further, in the portable terminal in accordance with the present invention, it is capable of minimizing the detached state of the window at high temperature which is generated by coupling the window and the terminal body to each other by using the adhesive agent.

Further, the coupling unit operates to electrically connect the electrode layer of the window to the ground formed at the terminal body, thereby being capable of dissipating the static electricity generated at the interior or exterior of the terminal.

Further, the coupling unit is adhered to the terminal body so that the space due to the adhesive agent, thereby being capable of relatively enlarging the display screen for the user.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present inventive features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A portable terminal, comprising:
a terminal body having a display module which is mounted therein;
a window configured to cover a surface of the display module, and including an electrode layer for sensing a touch,
a protecting layer for covering at least part of a front surface of the electrode layer, and
a base having a hole;
a window mounting portion configured to mount the window, the window mounting portion formed at the terminal body; and
a coupling unit having a screw inserted into the hole through a portion of the terminal body to couple the window to the terminal body,
wherein the window is fixedly coupled to the terminal body by the screw,
wherein the terminal body has a through hole, the through hole is configured to allow for a flexible printed circuit board to connect the electrode layer of the window with a connector disposed on a printed circuit board therethrough, and the through hole is formed on an upper portion of the terminal body at a periphery of the display module,
wherein the printed circuit board is arranged below the display module,
wherein the portable tenninal further includes an image input unit disposed at the upper portion of the terminal body and a manipulating portion disposed at a lower portion of the terminal body, and
wherein the display module is disposed between the image input unit and the manipulating portion.

2. The portable terminal of claim 1, wherein one end of the coupling unit is inserted into the base.

3. The portable terminal of claim 1, wherein the window is mounted at the window mounting portion in a direction towards a rear surface from a front surface of the terminal body.

4. The portable terminal of claim 1, wherein the window is mounted to the window mounting portion in a direction towards a front surface of the terminal body from a rear surface of the terminal body.

5. The portable terminal of claim 4, wherein the coupling unit further comprises a flange having an end locked to the terminal body.

6. The portable terminal of claim 1, wherein the terminal body comprises a ground and the coupling unit has one end connected to the electrode layer and another end electrically connected to the ground.

7. The portable terminal of claim 6, wherein the window mounting portion is covered with an EMI barrier material, and the coupling unit is in contact with the EMI barrier material.

8. The portable terminal of claim 1, wherein the base is mounted to the window mounting portion.

9. The portable terminal of claim 1, wherein the window has a printed layer which covers an edge of the display module.

10. The portable terminal of claim 1, wherein the protecting layer is configured to cover the electrode layer, and
wherein the base is disposed along an edge portion of the protecting layer.

11. A portable terminal, comprising:
a terminal body having a display module which is mounted therein;
a window configured to cover a surface of the display module, and including an electrode layer for sensing a touch,
a protecting layer for covering at least part of a front surface of the electrode layer, and
a base disposed along an edge portion of the protecting layer;
a window mounting portion configured to mount the window, the window mounting portion formed at the terminal body; and
a coupling unit inserted into the base so as to couple the window to the terminal body,
wherein the window is fixedly coupled to the terminal body by the coupling unit,
wherein the terminal body has a through hole, the through hole is configured to allow for a flexible printed circuit board to connect the electrode layer of the window with a connector disposed on a printed circuit board therethrough, and the through hole is formed on an upper portion of the terminal body at a periphery of the display module,
wherein the printed circuit board is arranged below the display module,
wherein the portable terminal further includes an image input unit disposed at the upper portion of the terminal body and a manipulating portion disposed at a lower portion of the terminal body, and
wherein the display module is disposed between the image input unit and the manipulating portion.

12. The portable terminal of claim 11, wherein the base has a hole into which the coupling unit is inserted.

13. The portable terminal of claim 11, wherein the window has a printed layer which covers an edge of the display module.

14. The portable terminal of claim 11, wherein the base is mounted to the window mounting portion.

* * * * *